United States Patent Office 3,652,723
Patented Mar. 28, 1972

3,652,723
THERMOSET MOLDING POWDERS EMPLOYING POLYCARBOXYL FUNCTIONAL PREPOLYMER AND DIEPOXIDE CROSSLINKING AGENT
John F. Fellers, Livonia, Seymour Newman, Southfield, and Amos Golovoy, Westland, Mich., assignors to Ford Motor Company, Dearborn, Mich.
No Drawing. Filed Nov. 16, 1970, Ser. No. 90,052
Int. Cl. C08g 45/04
U.S. Cl. 260—836
16 Claims

ABSTRACT OF THE DISCLOSURE

Novel thermosetting resin powders which can be molded to form products characterized, in tensile measurement, by high elongation-to-break, high strength and modulus and by a high glass transition temperature are prepared from a mixture of a prepolymer consisting essentially of methacrylic acid, methyl methacrylate, and methacrylonitrile or acrylonitrile and a diepoxide cross-linking agent.

THE INVENTION

This invention relates to self-crosslinking, dry thermosettable molding powders suitable for rapid curing during processing as by compression and injecting molding and applicable to the production of rigid, tough, structural material as, for instance, automobile body panels, electrical appliances, boat construction, storage tanks, conduits, particularly those for the transmission of heated fluids, etc., and to molded articles produced therefrom.

The thermosets of this invention, after molding, have a glass transition temperature above 90° C., preferably above 120° C. At room temperature (20°–25° C.) these moldings exhibit, in tensile measurement, a strength in the range of about 8000 to about 13,000 p.s.i. or higher, a modulus in the range of about 250,000 to 500,000 p.s.i. or higher and elongation-to-break in the range of about 2 to about 7 percent or higher.

Glass transition temperature is that temperature at which a glass-like material loses its rigidity and hardness and approaches the behavior of an elastomer. More specifically, the glass transition temperature is defined as the temperature at which such material shows a maximum in its mechanical damping at low frequencies, e.g., about 1 cycle per second.

(I) Composition of the prepolymer

The prepolymer has at least three constituent monomers and, except for limited substitution as hereinafter noted has the following basic composition:

| | Wt. percent |
|---|---|
| Methacrylic acid | 15–35 |
| Methacrylonitrile | 10–30 |
| Methyl methacrylate | Balance |

Acrylonitrile may be substituted in whole or in part for the methacrylonitrile but the latter is the preferred reactant in that products produced from prepolymers containing this constituent and the cross linking agents used herein have a higher heat distortion (glass transition) temperature than do the corresponding products using acrylonitrile, all other factors being equal.

A minor portion of the methyl methacrylate, preferably not more than one third thereof may be replaced with styrene, vinyl acetate or a different ester of acrylic or methacrylic acid in a monohydric alcohol, preferably a $C_2$–$C_4$ alcohol, e.g., ethyl acrylate, butyl acrylate, butyl methacrylate, etc. This substitute should not exceed about 15 weight percent of the total monomers used to form the prepolymer and preferably does not exceed 10% of the same. In the case of the $C_4$ substitute this component preferably does not exceed ⅕ of the methyl methacrylate. The substitutes mentioned in this paragraph, with the exception of styrene, increase the flexibility of the polymer, i.e., the elongation-to-break factor, and decrease the softening point (glass transition temperature).

(II) Properties of the prepolymer

The prepolymer has an average molecular weight in the range of about 1500 to about 16,000 preferably about 2,000 to about 10,000, and more preferably about 3500 to about 8,000, as expressed by Vapor Phase Osmometry using methyl ethyl ketone as solvent. Less than about 5% of the molecules thereof should have a molecular weight below about 1,000.

The prepolymer has a softening point above 25° C., preferably in the range of about 50° to about 130° C.

(III) Preparation of the prepolymer

The prepolymer is advantageously formed by solution polymerization using heat, a free radical initiator and an inert solvent. The prepolymer is preferably recovered by coagulation. Hexane, a mixture of hexane and toluene, etc., are suitable for this purpose. It may be recovered by evaporation but if this embodiment is used the product should be washed with a suitable solvent to remove low molecular weight components.

A free radical initiator is dissolved in the combined monomeric reactants and is advantageously employed in an amount equal to about 1–4 weight percent of the combined monomer weight. Conventional free radical initiators are suitable for this purpose, e.g., acyl peroxides, peresters, and azo compounds. Specific materials which have been used successfully include 2,2′-azobis (2-methyl propionitrile) hereinafter termed AIBN, t-butyl perbenzoate, and 4,4′-azobis-(4-cyanovaleric acid).

As aforementioned, the reaction is carried out in an inert solvent, e.g., dioxane. Advantageously, the weight of the solvent is equal to or in excess of the combined weight of the reactants and the initiator.

In a preferred method of preparation, the monomeric reactants and the free radical initiator are added in small increments, e.g., dropwise, to the solvent heated to reflux under nitrogen. When addition is complete, initiator in the amount of about 0.1% monomer weight is dissolved in a small amount of solvent and added over a period of 20–60 minutes. The reflux is then continued for about 2 hours. The prepolymer is then recovered by coagulation. This is preferably effected in the following manner. The reaction solution is further diluted with additional solvent until the prepolymer comprises about 10 to about 20 weight percent of the resultant solution. This solution is then added slowly to a liquid that will effect precipitation of the prepolymer. In this instance, hexane is quite suitable. A fine powder precipitates. This is recovered by filtration, dried, and, if necessary, broken up by rolling or grinding.

In addition to the aforedescribed method of prepolymer preparation the prepolymer can be formed by the well known technique of bulk polymerization.

(IV) Crosslinking agent

The crosslinking agent used in this invention is a diepoxide. A preferred diepoxide for this use is a cycloaliphatic diepoxide of the following formula:

Diepoxide 1

$$\underset{\text{O}}{\diamond}\!\!\!\!\!\!\!\diamond\!\!\!\!\!\!\!\!\!\begin{array}{c}-CH_2O-C-(CH_2)_4-C-O-H_2C-\\\|\phantom{xxxxxxxx}\|\\O\phantom{xxxxxxxxx}O\\-CH_3\phantom{xxxxxxxx}H_3C-\end{array}\!\!\!\diamond\!\!\!\!\!\!\diamond\underset{\text{O}}{}$$

Other suitable diepoxides for use in this invention include but not by way of limitation, the following:

Diepoxide 2

Diepoxide 3

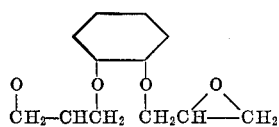

Diepoxide 4

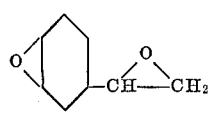

Diepoxide 5

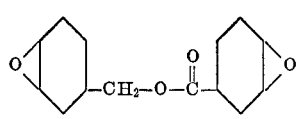

Diepoxide 6

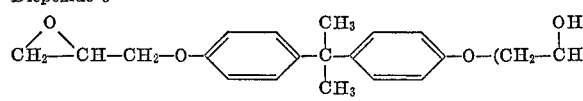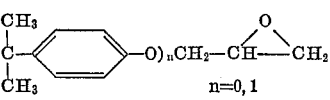

The crosslinking agent is employed in sufficient quantity to provide about 0.7 to about 1.0, preferably about 0.85 to about 1.0 epoxide groups for every carboxyl group in the prepolymer. An epoxide to carboxyl ratio within the preferred range has been found to give the best combination of strength properties and glass transition temperature.

(V) Catalyst

A catalyst is employed in the molding powder mix to facilitate the crosslinking reaction. Suitable catalysts include, tertiary amines, their halides, salts such as tetraethyl ammonium chloride, and siliconate amine salts. The siliconate amine salts and some halide salts are found to be latent catalysts for the carboxy-epoxy reaction. That is to say, these catalysts do not significantly enhance the rate of reaction at room temperature, but are effective only above certain temperatures. The catalysts that are latent up to at least 50° C. are to be preferred. Catalyst is advantageously used in an amount of about 0.5 to about 3.0 percent by weight of the molding powder, varying with the time and temperature of the molding cycle. See, "Extra-Coordinate Siliconate Salts as Latent Epoxy Resin Curing Agents," by H. L. Vincent et al., Organic Coatings and Plastics Chemistry, preprints, 28, No. 1, 1968, p. 504.

(VI) Preparation of the molding powder mix

The prepolymer powder, the crosslinking agent, the catalyst, and a reactive or unreactive plasticizer, when used, are dissolved in a suitable solvent, e.g., acetone, tetrahydrofuran, dioxane, etc., and the solution is thoroughly stirred. The solvent is evaporated under vacuum leaving a foamed cake which is crushed to a fine powder. The powder is further dried under vacuum so that it contains less than 1% of the solvent. Alternatively, to the prepolymer solution as obtained by polymerization are added crosslinking agent, reactive as unreactive diluent, if any, and the catalyst. The solution is stirred until homogenous and then added slowly to a vigorously stirred precipitating solvent such as hexane. The precipitating powder is dried under vacuum. In lieu of employing the precipitation solvent and roll mill, one may merely evaporate the solvent of the prepolymer solution.

Another method of preparing the molding powder consists of mixing together the prepolymer powder, crosslinking agent, additives if any, and catalyst and homogenizing by passing through an extrusion mixture or a roll mill.

If desired, reinforcing fillers such as asbestos, glass fibers, clay, calcium carbonate, calcium silicate, etc., may also be incorporated in the molding powders. These fillers are useful to increase the strength and heat distortion temperature of the finished product.

The powder thus prepared is suitable for use in injecting molding, compression molding and transfer molding.

This invention will be more fully understood from the following illustrative examples wherein tensile properties of the molded specimens are determined by using dog-bone test specimens with the overall sample length at 2 inches and the parallel gauge section length at ½ inch. The prepolymers in the foregoing examples have softening points between 50° and 130° C. with less than 5% of the molecules thereof having molecular weight below 1,000, except in Example 4, where the effect of molecular weight was investigated.

EXAMPLE 1

A prepolymer is prepared from the following components in the manner hereinafter set forth:

| Reactants: | Parts by wt. |
|---|---|
| Methyl methacrylate | 100 |
| Methacrylonitrile | 51 |
| Methacrylic acid | 64 |

The above named reactants are mixed and added in a 5 to 10 minute interval into a refluxing solution of 1000 ml. p-dioxane and 9 grams of t-butyl perbenzoate. The reaction vessel is kept under a nitrogen atmosphere at all times. The polymerizing mixture is refluxed for 4 hours.

After cooling, 2400 ml. of dioxane is added to the solution and 500 to 600 ml. of hexane. This mixture is then dripped into five gallons of rapidly stirred hexane to effect coagulation of the polymer to a fine white precipitate. The precipitate is allowed to settle and the hexane-dioxane mixture is taken off and discarded. The polymer is placed in a vacuum oven to dry. A sample of the dried polymer is dissolved in a water/ethanol mixture and titrated with 0.040 NaOH, and acid value of 1 equivalent/300 g. polymer is found.

The following procedure is used to make a molding powder: A solution is formed by blending 212 grams of the prepolymer, 31.8 grams of the diepoxide hereinbefore identified as diepoxide number 6, and 200 ml. dioxane. To this solution is added 0.5 ml. of dimethyl benzyl amine. This solution is then frozen and placed under vacuum to effect freeze drying. A porous cake results which is pulverized and further dried for 1 hour at 50° C. under vacuum. This powder is molded by the following procedure: Cured reactangular samples, 0.05 inch thick are obtained by compression molding of the dried powder in a press at 375° F. and about 1000 p.s.i. for 15 minutes. The examples are then cooled to room temperature by circulating cold water through the platens. A test of these samples provides the following average tensile measurements:

| | |
|---|---|
| Strength, p.s.i. | 10,000 |
| Elongation-to-break percent | 5 |
| Modulus, p.s.i. | 400,000–500,000 |
| Glass Transition Temp. ° C. | 120 |

EXAMPLE 2

The procedures of Example 1 are repeated except for the preparation of the prepolymer. The prepolymer in this instance is prepared from the following materials in the manner hereinafter set forth.

Materials: Parts by wt.
  Methyl methacrylate _____ 100
  Methacrylonitrile _____ 51
  Methacrylic acid _____ 64
  Initiator [1]

[1] 2,2'-azobis-(2-methyl propionitrile).

The above named materials are mixed to form a solution. This solution is dripped over a 4 hour period into a 2000 ml. round bottom flask containing 1000 ml. of refluxing dioxane. The reaction vessel is kept under a nitrogen atmosphere at all times. After cooling the prepolymer is coagulated and covered in the manner described in Example 1.

EXAMPLE 3

The procedures of Example 1 are repeated except for the preparation of the prepolymer. The prepolymer in this instance is prepared from the following materials in the manner hereafter set forth.

Materials: Parts by wt.
  Methyl mechacrylate _____ 100
  Methacrylonitrile _____ 51
  Methacrylic acid _____ 64
  Initiator [1] _____ 1.2

[1] 4,4'-azobis-4 (cyanovaleric acid).

The 4,4'-azobis-4 (cyanovaleric acid) is used to increase the number of chain ends terminated with a reactive carboxyl group. The preparation of the prepolymer and its recovery are effected by the procedure of Example 1.

EXAMPLE 4

A series of tests are made to illustrate the effect of the molecular weight of the prepolymer. With all the other factors being equal. The molecular weight of the prepolymer is changed by employing different concentrations of the reaction initiator. The materials used to form the prepolymer are as follows:

Reactants: Grams
  Methyl methacrylate _____ 100
  Methacrylonitrile _____ 51
  Methacrylic acid _____ 64
  Initiator _____ Variable The crosslinking agent used in these tests is the diepoxide hereinbefore designated diepoxide number 1. It is employed in an amount to provide a 1:1 stoichiometry of epoxy carboxy functional units in the molding powder mix. The initiator used in tests 1, 2 and 3 is AIBN and is employed in amounts (grams) of 13.6, 10.0 and 10.0, respectively. In test 4 the initiator is 4,4'-azobis-4 (cyanovaleric acid) and is employed in the amount of 17.1 grams. In test 5 the initiator is t-butyl perbenzoate in the amount of 9 grams. The results of these tests are set forth in the following table:

EFFECT OF PREPOLYMER MOLECULAR WEIGHT

| | Mol. wt. (determined after coagulation) | Tg, DC (° C.) | Elongation to break, percent | Yield stress, p.s.i. | Modulus, p.s.i. |
|---|---|---|---|---|---|
| 1 | [1] 2,500 | 70 | 7 | 5,250 | 290,000 |
| 2 | [2] 5,100 | 70 | 16 | 4,700 | 260,000 |
| 3 | [3] 5,100 | 125 | 4 | 10,400 | 445,000 |
| 4 | [4] 3,500 | 130 | 3 | 9,300 | 445,000 |
| 5 | [5] 8,200 | 145 | 7 | 13,200 | 540,000 |

[1] Sample used to produce molding not coagulated hence contained low molecular weight products.
[2] Same as (1).
[3] Sample used for molding coagulated hence molecular weight of prepolymer used in molding same as in molecular weight test.
[4] Sample used for molding coagulated and initiator changed to 4,4'-azobis-4 (cyanovaleric acid).
[5] Sample used for molding coagulated.

EXAMPLE 5

A series of tests are made to illustrate the effect of the structure of the diepoxide on the tensile properties of cured polymers at 25° C.

The prepolymer used in these tests is prepared from the following materials using the procedure hereinafter set forth:

Materials: Parts by wt.
  Methyl methacrylate _____ 100
  Methacrylonitrile _____ 51
  Methacrylic acid _____ 64

In all of these tests the epoxy/carboxy ratio is equal to about 1. The results of these tests are set forth in the following table:

EFFECT OF DIEPOXIDE STRUCTURE ON TENSILE PROPERTIES OF CURED POLYMERS AT 25° C.

| Diepoxide | Ultimate elongation, percent | Maximum stress, p.s.i. | Young's modulus, p.s.i.×10⁻⁵ |
|---|---|---|---|
| 1 | 7 | 13,200 | 5.4 |
| 2 [1] | 6 | 9,900 | 4.6 |
| 3 | 3 | 13,200 | 6.8 |
| 4 | 2 | 10,600 | 6.8 |
| 5 | 2 | 9,700 | 6.6 |

[1] Epoxide numbers relate to corresponding numbers at listing of epoxide formulas earlier herein.

EXAMPLE 6

A series of tests are made to illustrate the effect of varying the epoxy/carboxy ratio in the molding powder on mechanical properties of the molding at 25° C. The prepolymer for these tests is prepared from the materials and using the procedure employed in Example 1:

Materials: Parts by wt.
  Methyl methacrylate _____ 100
  Methacrylonitrile _____ 51
  Methacrylic acid _____ 64

The diepoxides used in all of these tests is the diepoxide previously illustrated and identified as diepoxide number 1. The results of these tests is set forth in the following table:

EFFECT OF EPOXY/CARBOXY RATIO ON MECHANICAL PROPERTIES AT 25° C.

| Epoxide conc., percent of stoichiometry | Tg, (° C.) | Ultimate elongation, (percent) | Maximum stress (p.s.i.) | Young's modulus, p.s.i.×10⁻⁵ |
|---|---|---|---|---|
| 40 | 122 | 5 | 11,200 | 4.4 |
| 60 | 141 | 6 | 12,600 | 4.4 |
| 80 | 150 | 6 | 13,000 | 4.4 |
| 100 | 145 | 7 | 13,200 | 5.4 |
| 120 | 145 | 4 | 10,000 | 4.4 |
| 160 | 127 | 4 | 10,600 | 4.2 |
| 180 | 120 | 4 | 11,100 | 4.2 |

EXAMPLE 7

The procedure of Example 1 is repeated with the difference that 25 mole percent of the methyl methacrylate used to form the copolymer is replaced with styrene.

EXAMPLE 8

The procedure of Example 1 is repeated with the difference that 1 mole percent of the methyl methacrylate used to form the copolymer is replaced with styrene.

EXAMPLE 9

The procedure of Example 1 is repeated with the difference that 15 mole percent of the methyl methacrylate used to form the copolymer is replaced with ethyl acrylate.

EXAMPLE 10

The procedure of Example 1 is repeated with the difference that 1 mole percent of the methyl methacrylate used to form the copolymer is replaced with ethylacrylate.

EXAMPLE 11

The procedure of Example 1 is repeated with the difference that 15 mole percent of the methyl methacrylate used to form the copolymer is replaced with butyl methacrylate.

EXAMPLE 12

The procedure of Example 1 is repeated with the difference that 1 mole percent of the methyl methacrylate used to form the copolymer is replaced with butyl methacrylate.

EXAMPLE 13

The procedure of Example 1 is repeated with the difference that 50 mole percent of the methacrylonitrile used to form the copolymer is replaced with acrylonitrile.

The foregoing examples are illustrative of the invention defined in the appended claims. Those skilled in the art will be aware that modifications may be made therein without departing from the scope of the invention as set forth in the appended claims.

We claim:

1. A molding powder which comprises an intimate mixture of (a) a copolymer consisting of about 15 to about 35 weight percent methacrylic acid, about 10 to about 30 weight percent methacrylonitrile or acrylonitrile and a remainder consisting essentially of methyl methacrylate and having average molecular weight in the range of about 1,500 to about 16,000, and (b) a diepoxide, said diepoxide being present in sufficient quantity to provide about 0.7 to about 1.0 epoxide groups for each carboxyl group in said copolymer.

2. A molding powder in accordance with claim 1 wherein said diepoxide is a cycloaliphatic diepoxide.

3. A molding powder in accordance with claim 1 wherein said diepoxide is present in sufficient quantity to provide about 0.85 to about 1.0 epoxide groups for each carboxyl group in the prepolymer.

4. A molding powder in accordance with claim 1 wherein said copolymer consists of about 15 to about 35 weight percent methacrylic acid, about 10 to about 30 weight percent methacrylonitrile and a remainder consisting essentially of methyl methacrylate.

5. A molding powder in accordance with claim 1 wherein said remainder consists essentially of about 75 to about 99 mole percent methyl methacrylate and about 1 to about 25 mole percent styrene.

6. A molding powder in accordance with claim 1 wherein said remainder consists essentially of about 85 to about 99 mole percent methyl methacrylate and about 1 to about 15 mole percent of an ester of acrylic or methacrylic acid and a $C_2$–$C_4$ monohydric alcohol.

7. A molding powder in accordance with claim 1 wherein said copolymer has average molecular weight in the range of about 2,000 to about 10,000 with less than 5% of the molecules thereof having molecular weight below about 1,000.

8. A molding powder in accordance with claim 1 wherein said copolymer has average molecular weight in the range of about 3,500 to about 8,000 with less than 5% of the molecules thereof having average molecular weight below 1,000.

9. A molded article having glass transition temperature above about 90° C., tensile strength above about 8,000 p.s.i., tensile modulus above about 250,000 p.s.i., and elongation-to-break above 2 percent and formed from a molding powder which comprises an intimate mixture of (a) a copolymer consisting of about 15 to about 35 weight percent methacrylic acid, about 10 to about 30 weight percent methacrylonitrile or acrylonitrile and a remainder consisting essentially of methyl methacrylate and having average molecular weight in the range of about 1,500 to about 16,000, and (b) a diepoxide, said diepoxide being present in sufficient quantity to provide about 0.7 to about 1.0 epoxide groups for each carboxyl group in said copolymer.

10. A molded article in accordance with claim 9 wherein said diepoxide is a cycloaliphatic diepoxide.

11. A molded article in accordance with claim 9 wherein said diepoxide is present in sufficient quantity to provide about 0.85 to about 1.0 epoxide groups for each carboxyl group in the prepolymer.

12. A molded article in accordance with claim 9 wherein said copolymer consists of about 15 to about 35 weight percent methacrylic acid, about 10 to about 30 weight percent methacrylonitrile and a remainder consisting essentially of methyl methacrylate.

13. A molded article in accordance with claim 9 wherein said remainder consists essentially of about 75 to 99 mole percent methyl methacrylate and about 1 to about 25 mole percent styrene.

14. A molded article in accordance with claim 9 wherein said remainder consists essentially of about 85 to about 99 mole percent methyl methacrylate and about 1 to about 15 mole percent of an ester of acrylic or methacrylic acid and a $C_2$–$C_4$ monohydric alcohol.

15. A molded article in accordance with claim 9 wherein said copolymer has average molecular weight in the range of about 2,000 to about 10,000 with less than 5% of the molecules thereof having molecular weight below about 1,000.

16. A molded article in accordance with claim 9 wherein said copolymer has average molecular weight in the range of about 3,500 to about 8,000 with less than 5% of the molecules thereof having average molecular weight below 1,000.

References Cited

UNITED STATES PATENTS

| 3,057,812 | 10/1962 | Straughan | 260—29.6 |
| 3,539,660 | 11/1970 | Hicks | 260—836 |

FOREIGN PATENTS

| 941,732 | 11/1963 | Great Britain | 260—836 |

PAUL LIEBERMAN, Primary Examiner

U.S. Cl. X.R.

260—2 EC, 37 EP, 41 A, 41 R, 41 AG, 47 EC, 80.8, 80.81, 837 R